United States Patent [19]

Mochizuki et al.

[11] Patent Number: 4,935,189

[45] Date of Patent: Jun. 19, 1990

[54] METHOD OF PRODUCING PRESSURIZED GAS-ENTRAPPING CANDY

[75] Inventors: Keizo Mochizuki, Kawasaki; Mitsuhiro Sakurai, Tokyo, both of Japan

[73] Assignee: Meiji Seika Kaisha, Ltd., Tokyo, Japan

[21] Appl. No.: 281,166

[22] Filed: Dec. 8, 1988

[30] Foreign Application Priority Data

Dec. 24, 1987 [JP] Japan ................................ 62-325445

[51] Int. Cl.⁵ ................................................. A23G 3/00
[52] U.S. Cl. ..................................... 426/474; 426/572; 426/660; 426/661; 426/512; 426/515
[58] Field of Search .................... 426/660, 5, 661, 572, 426/474, 512, 515

[56] References Cited

U.S. PATENT DOCUMENTS

| | | | |
|---|---|---|---|
| Re. 26,959 | 9/1970 | Conrad | 426/548 |
| 3,556,811 | 1/1971 | Smith | 426/660 |
| 4,000,321 | 12/1976 | Mochizuki et al. | 426/5 |
| 4,139,589 | 2/1979 | Beringer et al. | 264/250 |
| 4,271,206 | 6/1981 | Fariel et al. | 426/572 |
| 4,279,931 | 7/1981 | Verwaerde et al. | 426/4.8 |
| 4,289,794 | 9/1981 | Kleiner et al. | 426/660 |
| 4,356,198 | 10/1982 | Parada et al. | 426/96 |
| 4,528,206 | 7/1985 | Kostin | 426/660 |

FOREIGN PATENT DOCUMENTS 55-118347  9/1980  Japan .

*Primary Examiner*—Donald E. Czaja
*Assistant Examiner*—Evan Federman
*Attorney, Agent, or Firm*—Armstrong, Nikaido, Marmelstein, Kubovcik & Murray

[57] ABSTRACT

A method of producing a pressurized gas-entrapping candy is disclosed, which candy releases the gas to generate pleasing sound in mouth, as it melts therein. The candy is produced by heating a mixture of raw materials and water to dissolve the mixture and to condense the same, cooling to solidify the condensate, crashing the solidified mass into particles, charging the particles in a mold to press the same for pre-shaping into a desired one, charging the pre-shaped piece into a pressure vessel, charging an inert gas under an increased pressure and heating the pressure vessel to cause a partial melting of the particles constituting the pre-shaped candy piece, and to entrap the gas in a candy piece which has finally no pore in its outer surface.

6 Claims, No Drawings

METHOD OF PRODUCING PRESSURIZED GAS-ENTRAPPING CANDY

BACKGROUND OF THE INVENTION

1. Field of the Invention

The present invention relates to a method of producing a candy, and more particularly a pressurized gas-entrapping candy.

2. Related Art

As one of methods of producing a pressurized gas-entrapping candy, the present inventors have proposed in Jap. Pat. No. 55-118347(A) a method comprising steps of charging candy powder in a pressure vessel, charging an atmosphere of a pressurized gas of nitrogen, carbon dioxide or the like in the vessel heating the vessel to cause a mutual binding of particles on the candy powder, cooling the vessel while maintaining the pressure therein, as it is, and then reliesing the pressure to produce the pressurized gas-entrapping candy.

The candy product according to the above method has accorded a favorable reception in the market, since it entraps a pressurized gas therein and will suddenly release the gas to generate a series of pleasing sound, as it puts and melts in mouth.

However, such a candy product has a disadvantage of that a thermal resisting temperature thereof is about 35° C. to show a relatively low thermal stability. Namely, if the candy product is stored under inadequate conditions in summer season or if stored an extended period of time even under allowable conditions, the candy cannot entrap the gas therein and allows at least a part of the gas to escape therefrom. As a result, there may be a case of generating a sound of low level or no sound. This means that the candy product entrapping a pressurized gas will be a so-called—seasonable good— which is difficult or impossible to destribute the same in summer season, even in Japan, and can not be imported to subtropic and tropic countries.

SUMMARY OF THE INVENTION

Therefore, a main object of the invention is to provide a method of producing a pressurized gas-entrapping candy which shows an improved thermal resistance.

A specific object of this invention is to provide a method of producing a pressurized gas-entrapping candy which resists to a maximum ambient temperature at 40° to 45° C., to cause no noticeable reduction in its sound generating characteristics when it is sucked or tested in mouth.

According to the invention, such and other objects can be attained by a method of producing a pressurized gas-entrapping candy, which comprises steps of mixing 20–35 parts by weight of sugar, 20–35 parts by weight of lactose, and 30–60 parts by weight of a starch hydrolysate containing oligosaccharides wherein tetra and/or more higher saccharides occupy 50-80% by weight thereof, heating the mixture to condense the same at a temperature of 140°–150° C., cooling the condensate to cause a solidification thereof, crashing the solidified mass into particles, charging the particles in a mold to press the same and to prepare a pre-shaped candy piece, in a specified level charging pressurized carbon dioxide gas into vessel charging the pre-shaped candy piece into a pressure vessel, heating the vessel to cause a partial melting of the particles constituting the candy piece, cooling the vessel while maintaining the inner pressure of the vessel, and then releasing the pressure in the vessel.

It is preferable to use as the sugar a refined and granulated sugar, since a sugar containing impurities in relatively large amount will reduce a thermal resistance of the final candy product. It is preferable to compose the sugar in the amount of 20 to 35 parts, when total amount of all ingredients (composition) for the candy is made as 100 parts (please note the—part(s)—as referred to later is that by weight basis), since its content is below 20 parts, the final candy product shows an insufficient sweetness to decrease its liking and while it exceeds 35 parts, the candy product tends to easy melt and shows a low thermal resistance.

It is preferable to compose the lactose in an amount of 20 to 35 parts based on the total weight of the composition, since if its content is below 20 parts, the final candy product is not suitable in its low thermal resistance, and while it exceeds 35 patrs, there is a possible case of causing a crystallization of lactose to make impossible to maintain a texture for the candy, in the step of concentration.

As the starch hydrolystate to be employed for the invention, it is preferable to use that containing the oligosaccharides, in which main ingredient is tetra and-/or more highly saccharides, since, when the oligosaccharides containing di and /or trisaccharides as main ingredient(s), the final candy product shows a low thermal resistance. It is necessary that total amount of the tetra and/or more highly saccharides occupy in the range of 50 to 80% by weight based on the total amount of oligosaccharides for the starch hydrolysate, as apparently seen from results of Test Example, given later.

To prepare the pressurized gas-entrapping candy according to the invention, in the first place, the ingredients of sugar, lactose and starch hydrolysate are mixed and dissolved in water of appropriate amount and the mixture is concentrated. Please note that the temperature of mixture in the concentration step should be kept in said range of 140°–160° C., since if the concentration is carried out at a mixture temperature of below 140° C., the resulting concentrate becomes too soft, due to its excess moisture content to make difficult a pressurized gas entrapping therein, to be carried out later and if the concentration is carried out at a temperature higher than 160° C., a browning tends to occur due to thermal decomposition of the sugar component, which means it is difficult obtain a desirable final candy product.

The resulting condensate is cooled to room temperature to cause a soldification thereof. The solidified mass is crashed or pulverized, for instance by a conventional disc mill, roll mill or the like and a size of the particles is made as passing through a 10 mesh sieve according to the Japanese Industrial Standards (JIS), since if the particle size is larger as the particles which can not pass the 10 mesh sieve, an amount of the gas entrapped by mutual and partial melting of the particles in later pressurized gas-entrapping step shall be made in excess to cause a possible disintegration of the product of pressurized gas-entrapping candy, which means a reduction of yield. Further the disintegration of the candy product may occur also by the way of transportation. Please note that there is no lower limit value of the particle size.

The candy particles are charged in a mold having a desired inner shape, and pressed for to prepare a pre-shaped candy piece. It is preferable to select the shaping pressure in a range of 50-200 kg/cm$^2$. If the pressure is less than 50 kg/cm$^2$, a desired shaping will become difficult and while if more than 200 kg/cm$^2$, the resulting shaped material is not so porous in outer surface thereof to prevent a flowing of the gas therein, in the subsequent pressurized gas-entrapping step, and thus a desired pressurized gas-entrapping candy can not be obtained.

The resulting pre-shaped candy piece are put into the pressure vessel, and the pressurized gas to be entrapped in the final candy product is charged into the vessel. According to the invention, carbon dioxide gas is selected as the entrapping gas, on the ground that carbon dioxide gas is more preferable for providing a sound pressure in a desired high level, then other recognizable gases such as nitrogen gas. For preparing a desired pressurized gas-entrapping candy, it is required to increase an inner pressure of the vessel in a range of 10-50 kg/cm$^2$ with the gas and to raise a temperature of the pre-shaped candy pieces in a range of 100°-140° C., on the following grounds. If the inner pressure of the vessel is less than 10 kg/cm$^2$, a pressure of the entrapped gas is not sufficient for generating pleasing sound in the mouth and while, even if the inner pressure is set to a value higher than 50 kg/cm$^2$, appreciable difference is not recognized on the sound to be generated. If the temperature of the pre-shaped candy piece at the gas-entrapping step is below 100° C., the partial melting thereof becomes difficult to provide an insufficient gas-entrapping, and if the temperature is higher than 140° C., the pre-shaped candy piece melts in excess to possibly cause its fluidization, which not only makes a sufficient gas-entrapping difficult but also causes a sticking of the final candy product to the vessel to make troublesome a taking out of the product from the vessel.

The heating of the pre-shaped candy pieces accommodated in the vessel for carrying out the gas-entrapping operation can be made by externally heating the vessel per se, or irradiating a microwave therein to directly heat the pre-shaped candy pieces.

After completion of the pressurized gas-entrapping treatment, the vessel is cooled from outside to room temperature, while maintaining the inner pressure of the vessel in said level. Then, carbon dioxide gas in the vessel is reliesed (recovered) to take out desired pressurized gas-entrapping candy. Each of the resulting candy pieces is wrapped with a wrapping sheet and the wrapped candies are packed in a carton for sale, in a conventional manner.

PREFERRED EMBODIMENT OF THE INVENTION

The invention will now be explained in more detail with reference to a Test Example and an Example for preparing a candy product according to the invention.

Test Example

Following test is carried out to determine an appropriate content range on tetra or more higher saccharides in oligosaccharides for a starch hydrolysate.

Various compositions for a candy product were prepared. Namely, each of the compositions contains 30 parts by weight of sugar, 30 parts by weight of lactose, and 40 parts by weight of starch hydrolysate, but is different in total content of tetra or more higher saccharides in the oligosaccharides for the starch hydrolysate, as 47.5% by weight, 50.3% by weight, 61.3% by weight and 80.0% by weight, respectively based on total weight of the oligosaccharides.

To each of 4 compositions, an appropriate amount of water was added and the mixture was heated at 150° C. to dissolve and to condense the same. The condensate was cooled to cause a solidification. The solidified mass was crashed with use of a disc type mill, so that the resulting particles pass a standard 10 mesh sieve based on the Japanese Industrial Standards (JIS). The candy particles were charged in a cylindrical container (inner diameter: 10 cm, an area near inner bottom surface forms a molding die) by 75 g. and a pressure of 100 kg/cm$^2$ was applied to the candy particles to pre-shape the same into a disc type one. Then the pre-shaped candy piece was put in a pressure vessel to raise an inner pressure in the vessel to 50 kg/cm$^2$ by feeding a pressurized gas of carbon dioxide into the vessel and simultaneously to heat the pre-shaped candy piece until temperature of the candy piece becomes to 120° C. Thereafter, the vessel was cooled to room temperature, while maitaining the inner pressure of the vessel in said level, and then the pressure was reliesed to obtain a pressurized carbon dioxide gas entrapping candy product.

Each of the candy products (2.5 g) having the different composition is made as a sample. Each of the samples was put in each of the thermostats held at a temperature of 40° C. and 45° C., respectively to left there for 1 or 4 weeks. Thereafter, each of the samples was dropped into a water bath of 150 ml to measure intensity of sound to be generated, as the sample melts in the water bath. Results are shown in following Table.

| | | | | |
|---|---|---|---|---|
| content of tetra and/or more higher saccharides in oligosaccharides for starch hydrolysates (% by weight) | 47.5 | 50.3 | 61.3 | 80.0 |
| sugar (parts) | 30 | 30 | 30 | 30 |
| lactose (parts) | 30 | 30 | 30 | 30 |
| hydrolysates (parts) | 40 | 40 | 40 | 40 |
| sound pressure at 40° C. after 1 week (dB) | 0 | 50 | 65 | — |
| sound pressure at 40° C. after 4 weeks (dB) | 0 | 45 | 65 | — |
| situation | no sound | somewhat weak sound | series of strong sound | difficult in production of gas-entrapping candy product |
| sound pressure at 45° C. after 1 week (dB) | 0 | 30 | 55 | — |
| sound pressure at 45° C. after 4 weeks (dB) | 0 | 25 | 50 | — |
| situation | no sound | audible sound | somewhat weak sound | difficult in production of gas-entrapping candy product |

As seen from the Table, the pressurized gas-entrapping candy product prepared by composing the starch hydrolysate, in which the content of the tetra and/or more higher saccharides in the oligosaccharides is less than 50% by weight, has lost its sound generating characteristic within a week, when it will be stored at a temperature of 40° or 45° C., and it has also been found that, when the content of tetra and/or more higher saccharides exceeds 80% by weight, a viscosity of the molten substance of the composition will become too high to make its concentration difficult.

Therefore, it is preferable to use as the starch hydrelysate containing the oligosaccharides as the tetra and-/or more higher succharides in an amount of 50 to 80% by weight.

Example

Water (40 parts by weight) was added to and mixed with raw materials (100 parts by weight) for a candy, which consists of a starch hydrolysate (milled jelly, 40 parts by weight) containing oligosaccharides of tetra and/or more higher saccharides in an amount of 61.3% by weight, a refined and granulated sugar (30 parts by weight), and lactose (30 parts by weight). The resulting mixture was concentrated at the mixture temperature of 150° C. and then the concentrate was cooled to cause a solidification thereof. The resulting mass was crushed with use of a disc type mill and treated with use of a 10 mesh standard sieve (Japanese Industrial Standards) to obtain candy particles having a size passing through the sieve.

The candy particles were charged in a cylindrical container having an inner diameter of 10 cm and pressure of 100 Kg/cm$^2$ was applied to the candy particles to prepare a pre-shaped candy piece.

The pre-shaped candy piece was put into a pressure vessel having an inner diameter of 12 cm and a jacket. After having sealed the vessel and charged carbon dioxide gas therein to increase an inner pressure thereof to 50 Kg/cm$^2$, over-heated steam was fed into the jacket of the vessel to heat the pre-shaped candy piece at 120° C.

Thereafter, water of room temperature was fed through the jacket, in lieu of the steam, until a temperature of a candy piece converted from the pre-shaped candy piece shall becomes to room temperature, while maintaining the inner pressure of the vessel at said value. Then, the pressure in the vessel was reliesed by recovering carbon dioxide gas therefrom to take out the candy piece entrapping the pressurized carbon dioxide gas.

During a sampling or tasting the candy product obtained above, a seried of pleasing sound was generated in mouth. After having stored such a candy product for 4 weeks at constant temperature condition of 40° C., the candy product was tasted to issue a series of pleasing sound in mouth, which sound or tone has no noticeable difference from that issued in case of that a fresh candy product of just after prepared was tasted.

What is claimed is:

1. A method of producing a pressurized gas-entrapping candy, which comprises steps of mixing 20–35 parts by weight of sugar, 20–35 parts by weight of lactose, and 30–60 parts by weight of a starch hydrolysate containing oligosaccharides wherein tetra and higher saccharides occupy 50–80% by weight thereof, heating the mixture at a temperature of 140°–150° C. to condense said mixture, cooling the condensate to cause a solidification thereof, crashing the solidified mass into particles, charging the particles in a mold to press the same and to prepare a pre-shaped candy piece, charging the pre-shaped candy piece into a pressure vessel, charging pressurized carbon dioxide gas into the vessel in a specified level, heating the vessel to cause a partial melting of the particles constituting the pre-shaped candy piece, cooling the vessel while maintaining an inner pressure of the vessel, and then releasing the pressure in the vessel.

2. A method as claimed in claim 1, wherein said sugar is a refined and granulated one.

3. A method as claimed in claim 1, wherein said particles have a size passing through a 10 mesh sieve according to the Japanese Industrial Standards.

4. A method as claimed in claim 1, wherein said particles charged in the mold is pressed under a pressure of 50–200 kg/cm$^2$, to form the pre-shaped candy piece.

5. A method as claimed in claim 1, wherein said pressurized gas-entrapping operation is carried out by setting an inner pressure of the pressure vessel to a value of 10–50 kg/cm$^2$, with carbon dioxide gas.

6. A method as claimed in claim 1, wherein said pre-shaped candy piece in the pressure vessel is heated to a temperature of 100°–140° C., when the pressurized gas-entrapping operation is carried out.

* * * * *